(12) United States Patent
McIntosh

(10) Patent No.: US 12,284,992 B2
(45) Date of Patent: Apr. 29, 2025

(54) SPILL RESISTANT TRAVEL BOWL

(71) Applicant: Scott Alan McIntosh, Los Angeles, CA (US)

(72) Inventor: Scott Alan McIntosh, Los Angeles, CA (US)

( * ) Notice: Subject to any disclaimer, the term of this patent is extended or adjusted under 35 U.S.C. 154(b) by 127 days.

(21) Appl. No.: 17/822,334

(22) Filed: Aug. 25, 2022

(65) Prior Publication Data
US 2024/0065225 A1 Feb. 29, 2024

(51) Int. Cl.
*A01K 7/00* (2006.01)

(52) U.S. Cl.
CPC .................................... *A01K 7/005* (2013.01)

(58) Field of Classification Search
CPC ........ A01K 7/005; A01K 1/0272; A01K 7/00; A01K 5/01; A01K 5/0107; A01K 5/0135; B24C 3/26; B60N 3/10–108; A47G 19/2261; A47G 2400/086; A47G 2400/08
See application file for complete search history.

(56) References Cited

U.S. PATENT DOCUMENTS

| | | | | |
|---|---|---|---|---|
| 1,884,972 A | * | 10/1932 | Hacker | A01K 5/01 119/61.31 |
| 1,918,729 A | * | 7/1933 | Whitmer | A01K 5/01 119/72 |
| 2,926,879 A | * | 3/1960 | Dietrich | B63B 29/12 224/406 |
| 3,386,392 A | | 6/1968 | Gramm | |
| 4,436,056 A | | 3/1984 | MacLeod | |
| 4,819,843 A | * | 4/1989 | Nakayama | B60N 3/103 220/737 |
| 5,209,184 A | | 5/1993 | Sharkan et al. | |
| 5,297,504 A | | 3/1994 | Carrico | |
| 5,370,060 A | * | 12/1994 | Wang | B60N 3/004 297/163 |
| 5,489,055 A | * | 2/1996 | Levy | B60R 7/00 224/544 |
| 5,641,083 A | * | 6/1997 | Metcalf | A47B 43/00 211/187 |
| 5,738,019 A | * | 4/1998 | Parker | A47B 9/00 108/108 |

(Continued)

FOREIGN PATENT DOCUMENTS

| | | | | |
|---|---|---|---|---|
| CH | 658570 A5 | * | 11/1986 | ........... A01K 1/0356 |
| WO | WO-2020123834 A1 | * | 6/2020 | ......... A47G 23/0225 |

*Primary Examiner* — Monica L Perry
*Assistant Examiner* — Carly W. Lynch

(57) ABSTRACT

A spill-resistant bowl assembly includes a unitary bowl hanger frame, a gimbal mounting, and a bowl. The gimbal mounting has a unitary mounting frame and a gimbal ring. The bowl hanger frame has two parallel inverted "L"-shaped legs joined with a transverse member. The legs have evenly spaced adjustment pegs. The mounting frame has a horizontal member, with keyhole slots connected to the pegs, and arced arms with a socket in each arm. The ring has diametrically opposed pegs on a first axis and diametrically opposed notches along a second axis perpendicular to the first axis; with the ring pegs connected to the sockets. The bowl has a rim with diametrically opposed pegs connected to the notches. The travel bowl assembly may be suspended from a car seat headrest so a dog has easy access to water at a comfortable height without spilling.

6 Claims, 4 Drawing Sheets

(56) References Cited

U.S. PATENT DOCUMENTS

| | | | | |
|---|---|---|---|---|
| 5,738,037 | A | * | 4/1998 | Mahan .................... A01K 7/005 |
| | | | | 119/72 |
| 5,881,670 | A | | 3/1999 | Pelsor |
| 7,296,539 | B2 | | 11/2007 | Iljas |
| 7,527,017 | B1 | | 5/2009 | Cribb |
| 7,600,486 | B2 | | 10/2009 | Ellis |
| 8,146,534 | B1 | | 4/2012 | Robertson |
| 9,258,979 | B2 | | 2/2016 | Alexander |
| 10,028,484 | B2 | | 7/2018 | Ross |
| 2006/0011142 | A1 | | 1/2006 | Walter |
| 2006/0060149 | A1 | | 3/2006 | Skowronski |
| 2006/0249089 | A1 | | 11/2006 | Behunin |
| 2007/0151010 | A1 | | 7/2007 | Ellerbe |
| 2007/0284423 | A1 | | 12/2007 | Fioritti |
| 2008/0035644 | A1 | * | 2/2008 | Dahlquist ............... A47G 19/02 |
| | | | | 220/501 |
| 2008/0083374 | A1 | * | 4/2008 | Thomas ............... A01K 1/0272 |
| | | | | 119/28.5 |
| 2009/0194035 | A1 | * | 8/2009 | Cody .................... A01K 1/0272 |
| | | | | 119/702 |
| 2010/0018466 | A1 | * | 1/2010 | Austin ................. A01K 1/0272 |
| | | | | 119/28.5 |
| 2010/0180826 | A1 | | 7/2010 | Fioritti |
| 2016/0229590 | A1 | * | 8/2016 | Smaldone ............... A01K 7/005 |
| 2023/0180711 | A1 | * | 6/2023 | Stone .................... A01K 5/0128 |

\* cited by examiner

SPILL RESISTANT TRAVEL BOWL

BACKGROUND OF THE INVENTION

The present invention relates to dog bowls and, more particularly, to a spill resistant travel bowl.

Dogs that travel in cars are in constant need of hydration. Many dogs are often placed in the back seats. When water is in a currently available dog bowl inside a moving car, it is likely to spill due to bumps, turns and fast movements. In most cars, the only place for a water bowl is the floor of the car or on the car seat. Both locations are under the dog's feet where they will step on it or spill it. Moreover, older dogs, or dogs with mobility issues, often cannot put their head down and balance to access water in a bowl on the floor of a car or on a car seat in a moving car.

There are many "non-spill" travel bowls available on the market; however, they all rely on being placed directly on the seat or floor. This takes away valuable space for the dog to use while in the car. Dogs may step into or onto these bowls, creating inconvenience, spills, and water-mess because of the reduced space in the back seat.

As can be seen, there is a need for a non-spill travel bowl for dogs that does not occupy a car seat or floor.

SUMMARY OF THE INVENTION

In one aspect of the present invention, a spill-resistant bowl assembly comprises a unitary bowl hanger frame having two parallel inverted "L"-shaped legs, with evenly spaced adjustment pegs extending therefrom, joined with a transverse member; a gimbal mounting suspended from the unitary bowl hanger frame, comprising: a unitary mounting frame having a horizontal member defining keyhole slots removably coupled to a parallel set of the evenly spaced adjustment pegs, and arced arms defining diametrically opposed sockets, extending from the horizontal member; a gimbal ring with diametrically opposed pegs extending therefrom along a first axis, rotatably coupled to the diametrically opposed sockets, and diametrically opposed notches along a second axis perpendicular to the first axis; and a bowl having a rim with diametrically opposed pegs extending outward therefrom, rotatably coupled to the diametrically opposed notches.

The inventive bowl is advantageous because it frees up space and improves accessibility to water for dogs that travel in cars. Dogs may have the bowl set to a comfortable height to easily access water at all times with minimal spilling. These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a travel bowl assembly, comprising a bowl leash, a hanging rack, a double-axis gimbal, and a reservoir. The travel bowl assembly may be suspended from a car seat headrest.

The height may be adjusted so that any size dog may easily access fresh water.

A bowl leash configured to hang from the posts of an automotive headrest may have a series of knobs extending therefrom.

A hanging rack or frame is configured to receive the series of knobs on the bowl leash, locking the hanging rack in place.

A double-axis gimbal may snap in place and rest in the hanging rack, freely swinging to counteract vehicle movement, thus reducing spills and water-mess.

A reservoir or bowl may snap into and rest in the gimbal, swinging freely in both directions. The reservoir may contain, for example, up to about 40 oz. of water. Ice cubes may also be included in the reservoir.

In some embodiments, the assembly may further comprise a splash guard or cover with a curved underside snaps into the top of the reservoir, to limit water spillage while allowing the dog access to the water. The splash guard encourages water to splash back into the reservoir.

In some embodiments, the assembly may further comprise a "belt rack" component that accommodates a strap that may be secured around a tree. The hanging rack may be removed from the vehicle and hung on the belt rack.

In some embodiments, the assembly may further comprise a freestanding, height-adjustable stand. The hanging rack may be removed from the vehicle and placed onto the stand, e.g., at a campsite or yard.

The materials of manufacture are not particularly limited. For example, the components may be made from heavy-duty plastic. The reservoir and splash guard may be made from a non-bisphenol A (BPA) plastic.

The method of manufacture is not particularly limited. For example, the components may be made by three-dimensional (3D) printing or injection molding. The printed or molded components may then be assembled.

The bowl assembly may be installed in a car by removing a headrest and placing the bowl leash around the headrest posts, facing the rear of the seat, and reinserting the headrest. This secures the bowl leash to the headrest of the car. The hanging rack may be attached to the bowl leash such that the water bowl is positioned at a comfortable height on the back of the seat and out of the dog's way.

Figure 1:
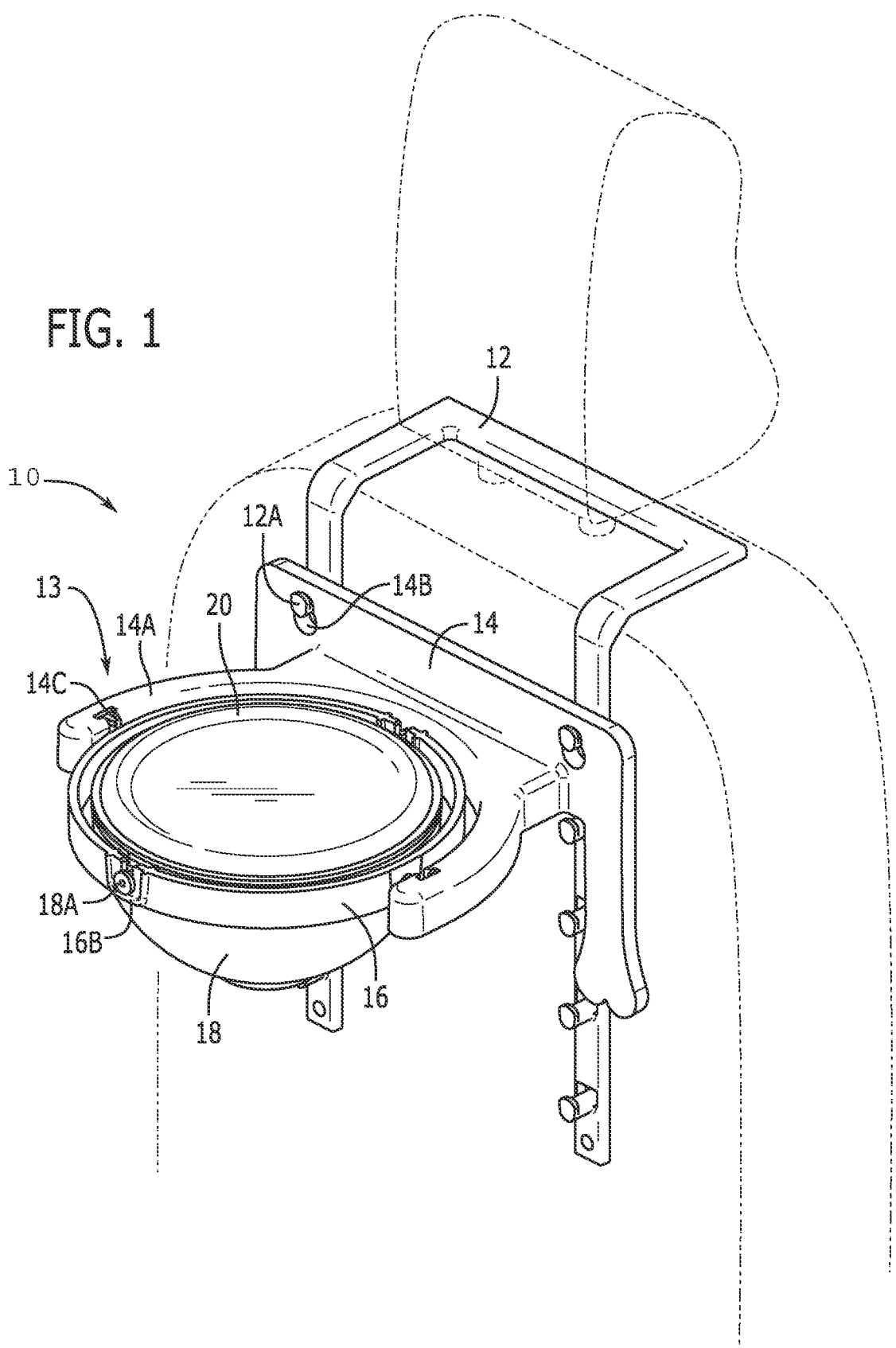
FIG. 1 is a front perspective view of a spill-resistant water bowl assembly according to an embodiment of the present invention.
Figure 2:
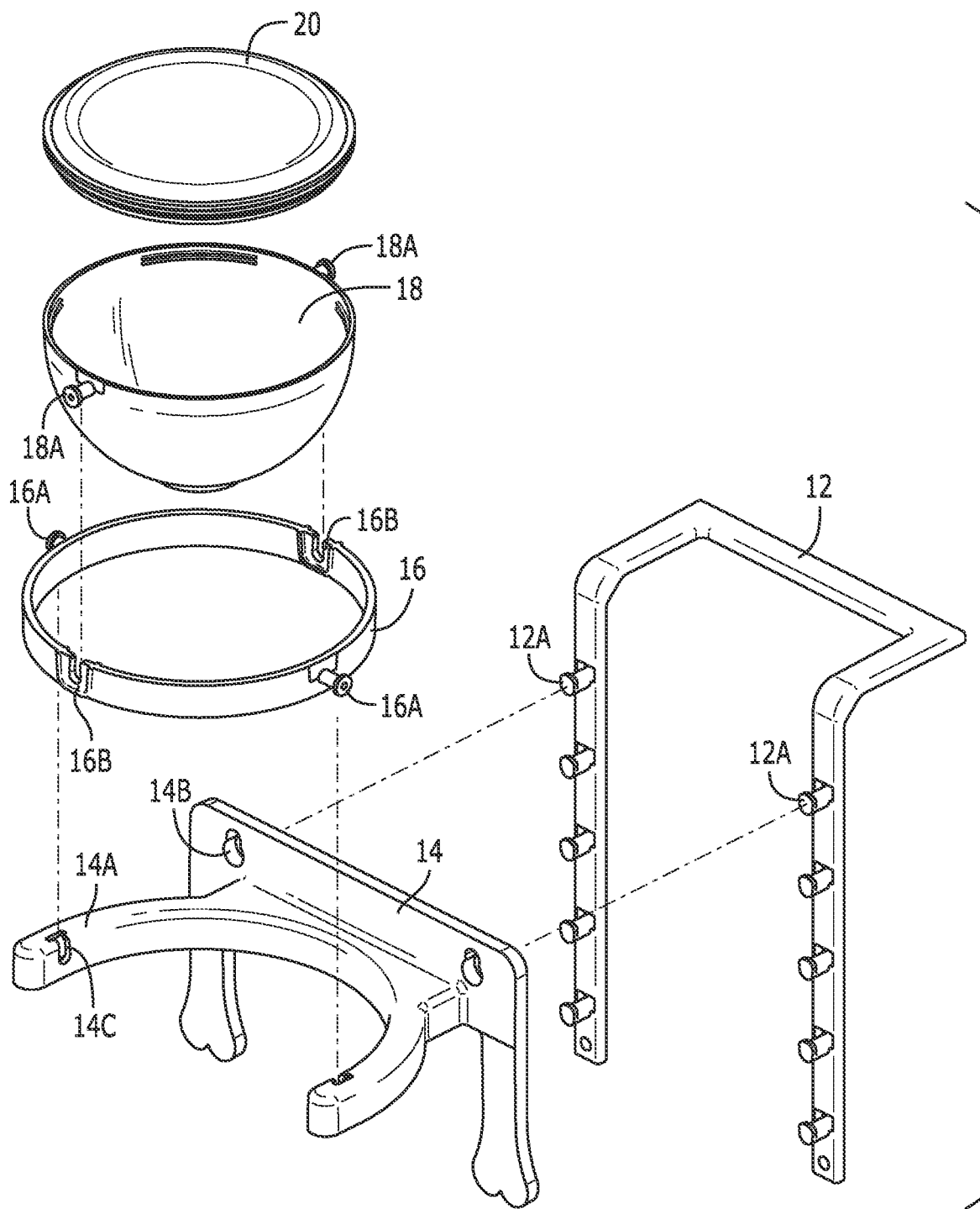
FIG. 2 is an exploded perspective view thereof.
Figure 3:
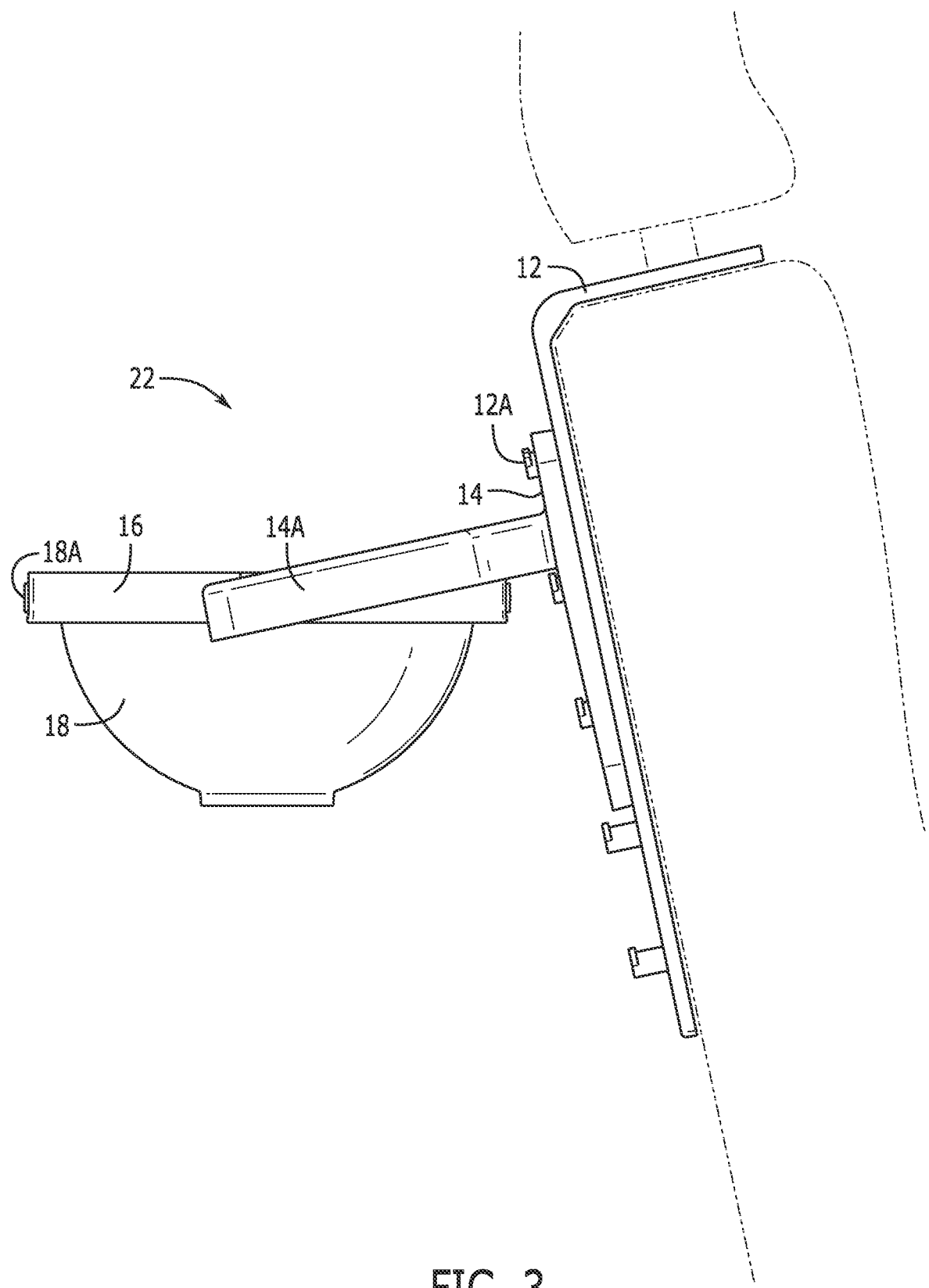
FIG. 3 is a side elevation view thereof, shown in use in a first orientation.
Figure 4:
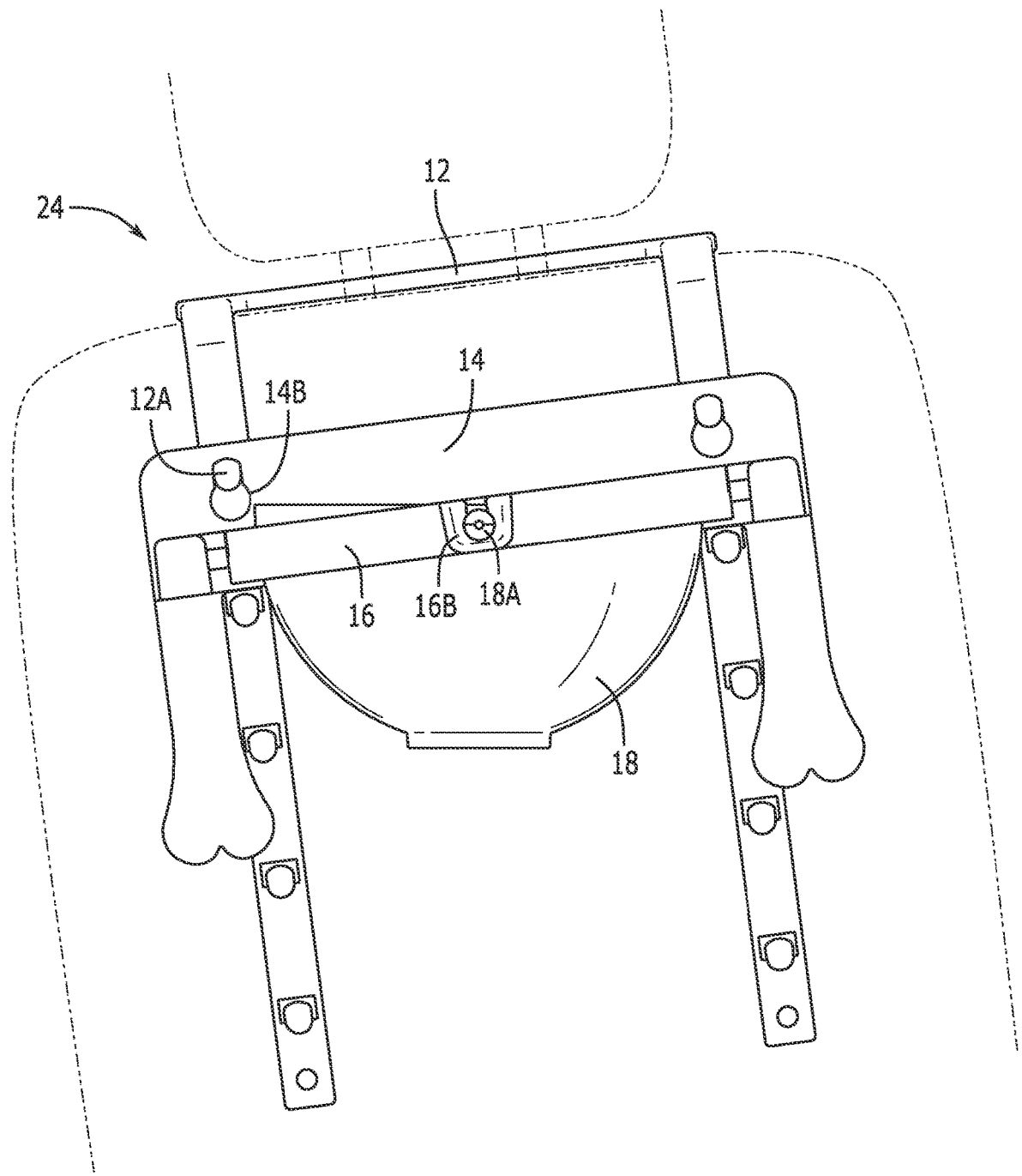
FIG. 4 is a front elevation view thereof, shown in use in a second orientation.

Referring to FIGS. 1 through 4, FIGS. 1 and 2 illustrate a spill-resistant bowl assembly 10 according to an embodiment of the present invention, comprising a bowl hanger frame 12; a gimbal mounting 13 comprising a mounting frame 14 and a gimbal ring 16; a bowl 18, and a lid or splash guard 20. The bowl hanger frame 12 is a unitary component having two parallel inverted "L"-shaped legs joined with a horizontal transverse member. The bowl hanger frame 12 legs each have a vertical portion with evenly spaced adjustment pegs 12A extending therefrom. The mounting frame 14 is a unitary component having a horizontal member with keyhole slots 14B operative to accommodate the adjustment pegs 12A and arced arms 14A forming a semicircle extending from the horizontal member. The arms 14A are formed with parallel notches or sockets 14C. The mounting frame 14 as shown has legs extending vertically from the horizontal member, flanking the adjustment pegs 12A. The gimbal ring 16 has pegs 16A operative to rest in the notches 14C and is formed with notches 16B along an axis perpendicular to the axis defined by the peg 16A. The bowl 18 has an exterior surface, an interior surface, and a rim from which pegs 18A, operative to rest in the gimbal ring notches 16B, extend. The splash guard 20 clips to the bowl 18 rim and redirects water reaching the rim back into the bowl 18. A lid may be used to seal the bowl opening in some cases. FIG. 3 shows a first orientation 22, illustrating rotary movement of the gimbal ring 16 within the parallel arm notches 14C. FIG. 4 shows a second orientation 24, illustrating rotary movement of the bowl 18 within the gimbal ring notches 16B.

It should be understood, of course, that the foregoing relates to exemplary embodiments of the invention and that modifications may be made without departing from the spirit and scope of the invention as set forth in the following claims.

What is claimed is:

1. A spill-resistant bowl assembly, comprising:
   (a) a unitary bowl hanger frame having two parallel inverted "L" shaped legs, with a parallel set of evenly spaced adjustment pegs extending therefrom, joined with a transverse member;
   (b) a gimbal mounting suspended from the unitary bowl hanger frame, comprising:
      (i) a unitary mounting frame having a horizontal member defining keyhole slots removably coupled to the parallel set of evenly spaced adjustment pegs, and arced arms defining diametrically opposed U-shaped sockets, the arced arms extending from the horizontal member;
      (ii) a gimbal ring with diametrically opposed pegs extending outward therefrom along a first axis, rotatably resting freely in the diametrically opposed U-shaped sockets of the arced arms, the gimbal ring further comprising diametrically opposed U-shaped notches along a second axis perpendicular to the first axis; and
   (c) a bowl having a rim with diametrically opposed pegs extending outward therefrom, rotatably resting freely in the diametrically opposed U-shaped notches of the gimbal ring.

2. The spill-resistant bowl assembly of claim 1, further comprising a splash guard removably coupled to the rim of the bowl.

3. The spill-resistant bowl assembly of claim 1, wherein the unitary mounting frame further comprises vertically extending legs configured to flank the parallel set of evenly spaced adjustment pegs.

4. The spill-resistant bowl assembly of claim 1, wherein the parallel set of evenly spaced adjustment pegs comprise multiple parallel pairs, and the unitary mounting frame is removably attached to any of the multiple parallel pairs such that the bowl is height-adjustable.

5. The spill-resistant bowl assembly of claim 1, wherein the two parallel inverted "L" shaped legs and the transverse member are configured to accommodate a vehicle's headrest supports.

6. The spill-resistant bowl assembly of claim 1, wherein the bowl is made from a bisphenol A-free plastic.

* * * * *